US012104562B2

(12) United States Patent
Hara et al.

(10) Patent No.: US 12,104,562 B2
(45) Date of Patent: Oct. 1, 2024

(54) BOAT PROPULSION DEVICE

(71) Applicant: YAMAHA HATSUDOKI KABUSHIKI KAISHA, Iwata (JP)

(72) Inventors: Kazuhiro Hara, Shizuoka (JP); Toru Takahashi, Shizuoka (JP); Norihito Tabata, Shizuoka (JP); Kazuki Sano, Shizuoka (JP); Shinsaku Soda, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 18/113,230

(22) Filed: Feb. 23, 2023

(65) Prior Publication Data

US 2024/0141855 A1 May 2, 2024

(30) Foreign Application Priority Data

Oct. 28, 2022 (JP) ................................ 2022-173339

(51) Int. Cl.
*F02M 35/10* (2006.01)
*B63H 20/24* (2006.01)
*F01N 13/10* (2010.01)

(52) U.S. Cl.
CPC ....... *F02M 35/1015* (2013.01); *B63H 20/245* (2013.01); *F01N 13/10* (2013.01); *F02M 35/10144* (2013.01)

(58) Field of Classification Search
CPC ......... F02M 35/1015; F02M 35/10144; B63H 20/245; F01N 13/10
USPC ........................................................... 60/323
See application file for complete search history.

(56) References Cited

U.S. PATENT DOCUMENTS

| | | | | |
|---|---|---|---|---|
| 5,674,099 A * | 10/1997 | Muramatsu | F01N 1/089 | 440/89 R |
| 6,752,240 B1 * | 6/2004 | Schlagenhaft | F02M 35/1266 | 181/247 |
| 11,578,687 B1 * | 2/2023 | Reichardt | F02M 35/10072 | |
| 2003/0064644 A1 * | 4/2003 | Nakajima | B63H 11/08 | 440/38 |
| 2017/0370334 A1 * | 12/2017 | Saiga | F02M 35/168 | |
| 2020/0392894 A1 * | 12/2020 | Kishimoto | F02B 61/045 | |

FOREIGN PATENT DOCUMENTS

JP 2016023595 A * 2/2016

* cited by examiner

*Primary Examiner* — Kenneth J Hansen
*Assistant Examiner* — Kelsey L Stanek
(74) *Attorney, Agent, or Firm* — Keating & Bennett, LLP

(57) ABSTRACT

An outboard motor includes an engine main body, and an intake device to supply air to the engine main body. The intake device includes a main intake pipe including a first intake pipe and a second intake pipe connected to a downstream end of the first intake pipe and extending at an angle with respect to an axial direction of the first intake pipe and through which the air supplied to the engine main body flows, and an extension pipe extending from a connection between the first intake pipe and the second intake pipe and including a resonance chamber therein. The extension pipe includes an extended peripheral wall and an end wall that closes the resonance chamber except for a portion adjacent to the main intake pipe.

11 Claims, 11 Drawing Sheets

BOAT PROPULSION DEVICE

CROSS REFERENCE TO RELATED APPLICATIONS

This application claims the benefit of priority to Japanese Patent Application No. 2022-173339, filed on Oct. 28, 2022. The entire contents of this application are hereby incorporated herein by reference.

BACKGROUND OF THE INVENTION

1. Field of the Invention

The present invention relates to a boat propulsion device.

2. Description of the Related Art

An intake device that supplies air to an internal combustion engine of a boat propulsion device may be provided with a resonator to reduce intake noise generated in an intake duct. Helmholtz resonators are commonly used as the resonator. The Helmholtz resonator has a neck portion that branches from the intake duct and a resonance chamber connected to the neck portion.

In general, boat propulsion devices are required to reduce low-frequency noise. Since the resonance frequency of the Helmholtz resonator is proportional to the opening area of the neck portion and inversely proportional to the length of the neck portion and the volume of the resonance chamber, it is necessary to increase the volume of the resonance chamber in order to shift the resonance frequency to the lower frequency side. In such a configuration, however, the intake device becomes larger. Such a problem is not limited to the intake device, but also applies to the case where a resonator is provided in an exhaust device.

SUMMARY OF THE INVENTION

A boat propulsion device according to a preferred embodiment of the present invention includes an internal combustion engine, and an intake device to supply air to the internal combustion engine, the intake device including a main intake pipe including a first intake pipe and a second intake pipe connected to a downstream end of the first intake pipe and extending at an angle with respect to an axial direction of the first intake pipe and through which the air supplied to the internal combustion engine flows, and an extension pipe extending from a connection between the first intake pipe and the second intake pipe and including a resonance chamber therein, wherein the extension pipe includes a partition wall that closes the extension pipe except for a portion of the extension pipe adjacent to the main intake pipe.

A boat propulsion device according to another preferred embodiment of the present invention includes an internal combustion engine, and an intake device to supply air to the internal combustion engine, the intake device including a main intake pipe including a first intake pipe and a second intake pipe connected to a downstream end of the first intake pipe and extending at an angle with respect to an axial direction of the first intake pipe and through which the air supplied to the internal combustion engine flows, and an extension pipe extending from a connection between the first intake pipe and the second intake pipe.

A boat propulsion device according to another preferred embodiment of the present invention includes an internal combustion engine, and an exhaust device to discharge exhaust gas from the internal combustion engine to outside of the boat propulsion device, the exhaust device including a main exhaust pipe including a first exhaust pipe and a second exhaust pipe connected to an upstream end of the first exhaust pipe and extending at an angle with respect to an axial direction of the first exhaust pipe and through which the exhaust gas discharged from the internal combustion engine flows, and an extension pipe extending from a connection between the first exhaust pipe and the second exhaust pipe and including a resonance chamber therein, wherein the extension pipe includes a partition wall that closes the extension pipe except for a portion of the extension pipe adjacent to the main exhaust pipe.

Preferred embodiments of the present invention are able to reduce the size of the intake device or exhaust device. The preferred embodiments of the present invention also facilitate design changes of the intake device or exhaust device.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Specific examples of preferred embodiments of the present invention are described below with reference to the drawings. It should be noted that the present invention is not limited to these examples, but is defined by the claims and is intended to include all modifications within the meaning and scope equal to the claims.

Figure 1:
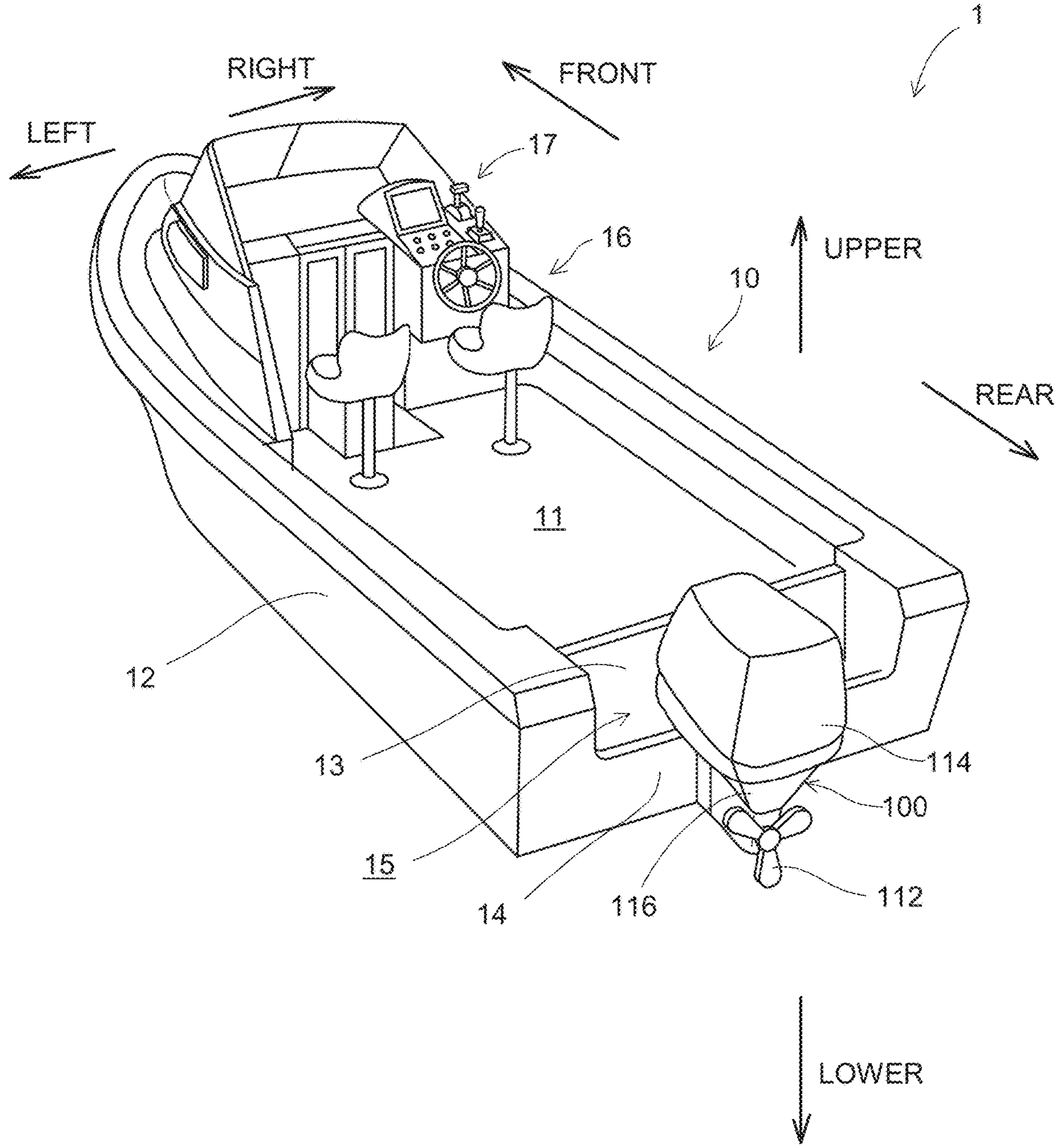
FIG. 1 is a perspective view schematically illustrating a configuration of a boat according to a preferred embodiment of the present invention.

A first preferred embodiment of the present invention will be described with reference to FIGS. 1 to 9. As shown in FIG. 1, the boat 1 includes a hull 10 and an outboard motor 100 (an example of a boat propulsion device). FIG. 1 and other figures described below show arrows representing each direction with respect to the position of the boat 1. More specifically, each figure shows arrows representing front (FRONT), rear (REAR), left (LEFT), right (RIGHT), upper (UPPER), and lower (LOWER) directions, respectively. The front-rear direction, left-right direction, and upper-lower direction (vertical direction) are perpendicular to each other.

The hull 10 of the boat 1 is for occupants to ride. As shown in FIG. 1, the hull 10 includes a hull body 12 having a living space 11, a pilot seat 16 in the living space 11, and an operating device 17 near the pilot seat 16. The operating device 17 maneuvers the boat and includes, e.g., a steering wheel, a shift throttle lever, a joystick, a monitor, and an input device. The hull 10 also includes a partition wall 13 that partitions the rear end of the living space 11 and a transom 14 at the rear end of the hull 10. In the front-rear direction, a space 15 exists between the transom 14 and the partition wall 13.

The outboard motor 100 in a reference attitude will be described below unless otherwise specified. The reference attitude is an attitude in which the rotational axis Ac of a crank shaft 124, which will be described below, extends in the upper-lower direction, and the rotational axis Ap of a propeller shaft 111 extends in the front-rear direction. The front-rear direction, the left-right direction, and the upper-lower direction are defined based on the outboard motor 100 in the reference attitude.

The outboard motor 100 generates thrust to propel the boat 1. As shown in FIG. 1, the outboard motor 100 is attached to the transom 14 at the rear of the hull 10. The outboard motor 100 includes an outboard motor main body 110 and a suspension device 150.

Figure 2:
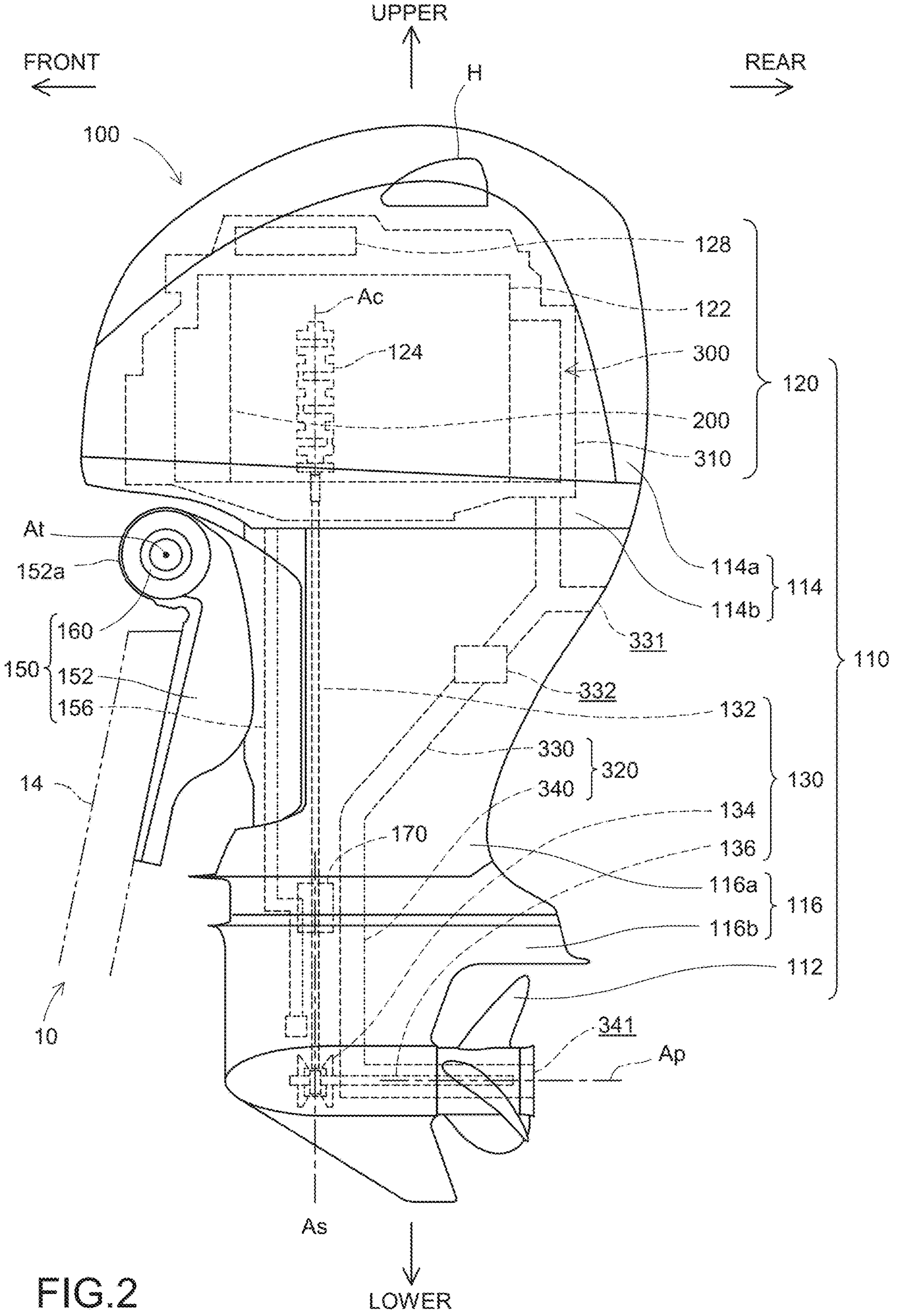
FIG. 2 is a side view schematically illustrating a configuration of an outboard motor according to a preferred embodiment of the present invention.

As shown in FIG. 2, the outboard motor main body 110 includes an engine assembly 120, a propeller 112, a power transmission mechanism 130, a cowl 114, and a casing 116.

As shown in FIG. 2, the cowl 114 is a housing located on top of the outboard motor main body 110. The cowl 114 includes an upper cowl **114*a* defining an upper portion of the cowl 114 and a lower cowl 114*b* defining a lower portion of the cowl 114. The upper cowl 114*a* is detachably attached to the lower cowl 114*b*. The upper cowl 114*a* includes a vent hole H. Vent hole H is an opening to take in air from a space external of the cowl 114 to inside the cowl 114**.

As shown in FIG. 2, the casing 116 is a housing located below the cowl 114 and provided in a lower portion of the outboard motor main body 110. The casing 116 includes an upper casing **116*a* defining an upper portion of the casing 116 and a lower casing 116*b* defining a lower portion of the casing 116**.

The engine assembly 120 includes multiple components centered on an engine main body 122 (an example of an internal combustion engine). As shown in FIG. 2, the engine assembly 120 includes an intake device 200, an electrical component 128 (e.g., fuse box, ECU, and steering CU), and an exhaust device 300 in addition to the engine main body 122. The engine main body 122, the intake device 200, and the electrical component 128 are accommodated in the cowl 114, and an exhaust device 500 is accommodated in the cowl 114 and the casing 116.

The engine main body 122 is the prime mover for generating power. The engine main body 122 includes a cylinder housing a piston that reciprocates due to combustion of a mixture containing fuel and air, and a crank shaft 124 which rotates with the reciprocation of the piston. The cylinder includes a cylinder body that houses the piston and a cylinder head that, together with the piston and cylinder body, defines a combustion chamber in which the mixture burns. The cylinder head includes multiple intake ports opened and closed by intake valves and multiple exhaust ports opened and closed by exhaust valves. As shown in FIG. 2, the crank shaft 124 is arranged in such a manner that its rotational axis line Ac extends in the upper-lower direction.

Figure 3:
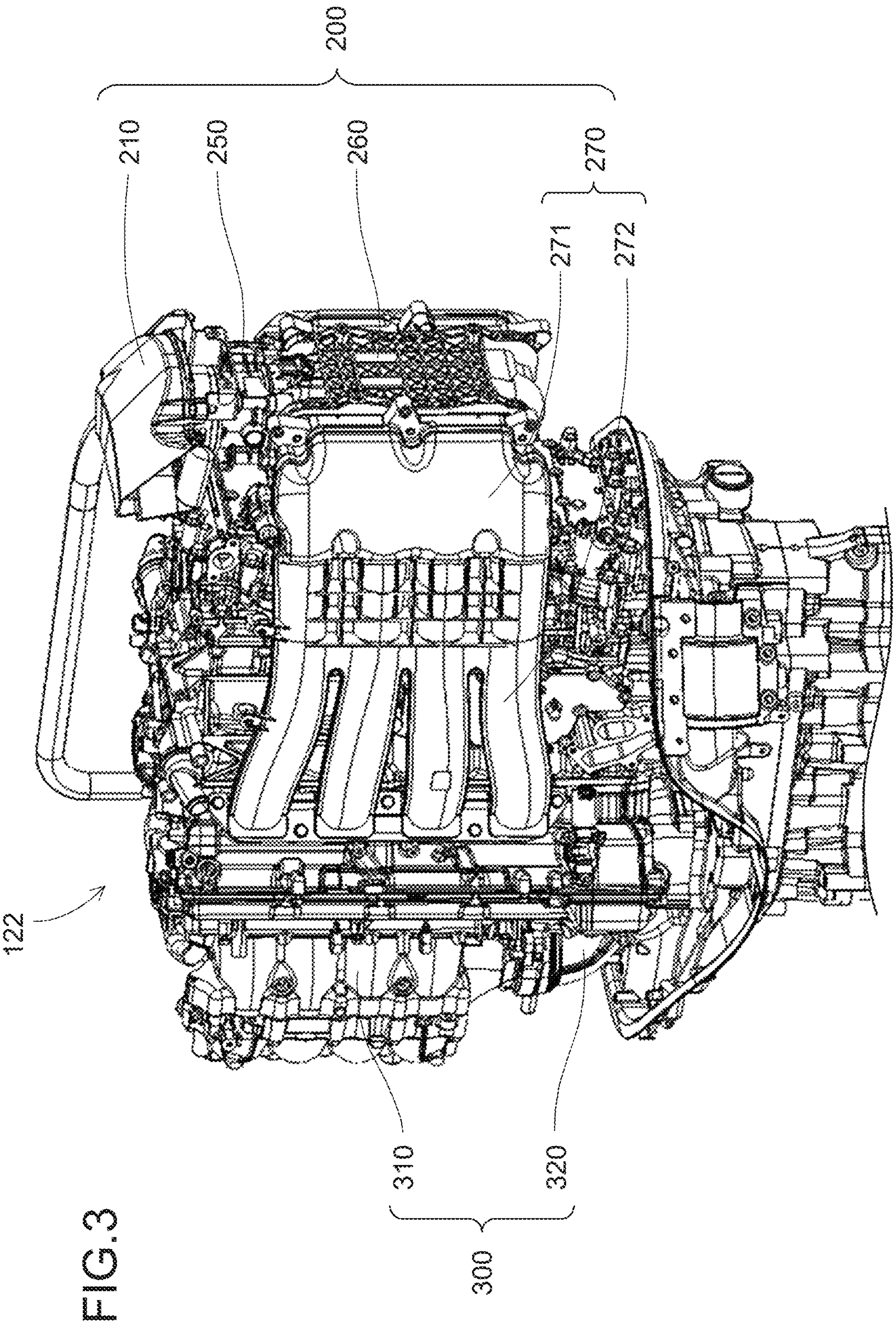
FIG. 3 is a partially enlarged perspective view illustrating a main portion of an engine assembly according to a preferred embodiment of the present invention.

The intake device 200 is connected to an intake port and supplies the air taken into the cowl 114 through the vent hole H to the engine main body 122. As shown in FIG. 3, the intake device 200 includes an air conducting member 210, a throttle body 250, a surge tank 260, and an intake manifold 270. The air conducting member 210, the throttle body 250, the surge tank 260, and the intake manifold 270 are connected in this order from the upstream side, and the intake manifold 270 is connected to the engine main body 122.

Figure 4:
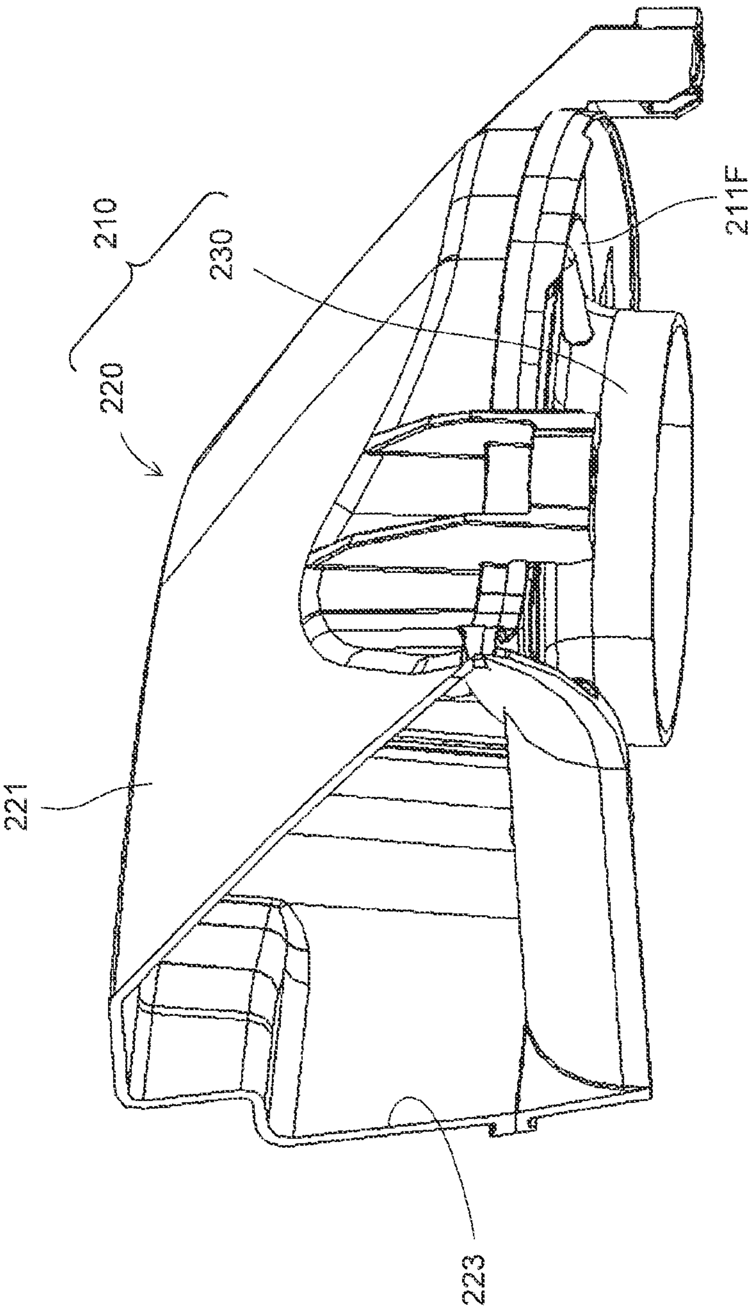
FIG. 4 is a perspective view of an air conducting member according to a preferred embodiment of the present invention.
Figure 5:
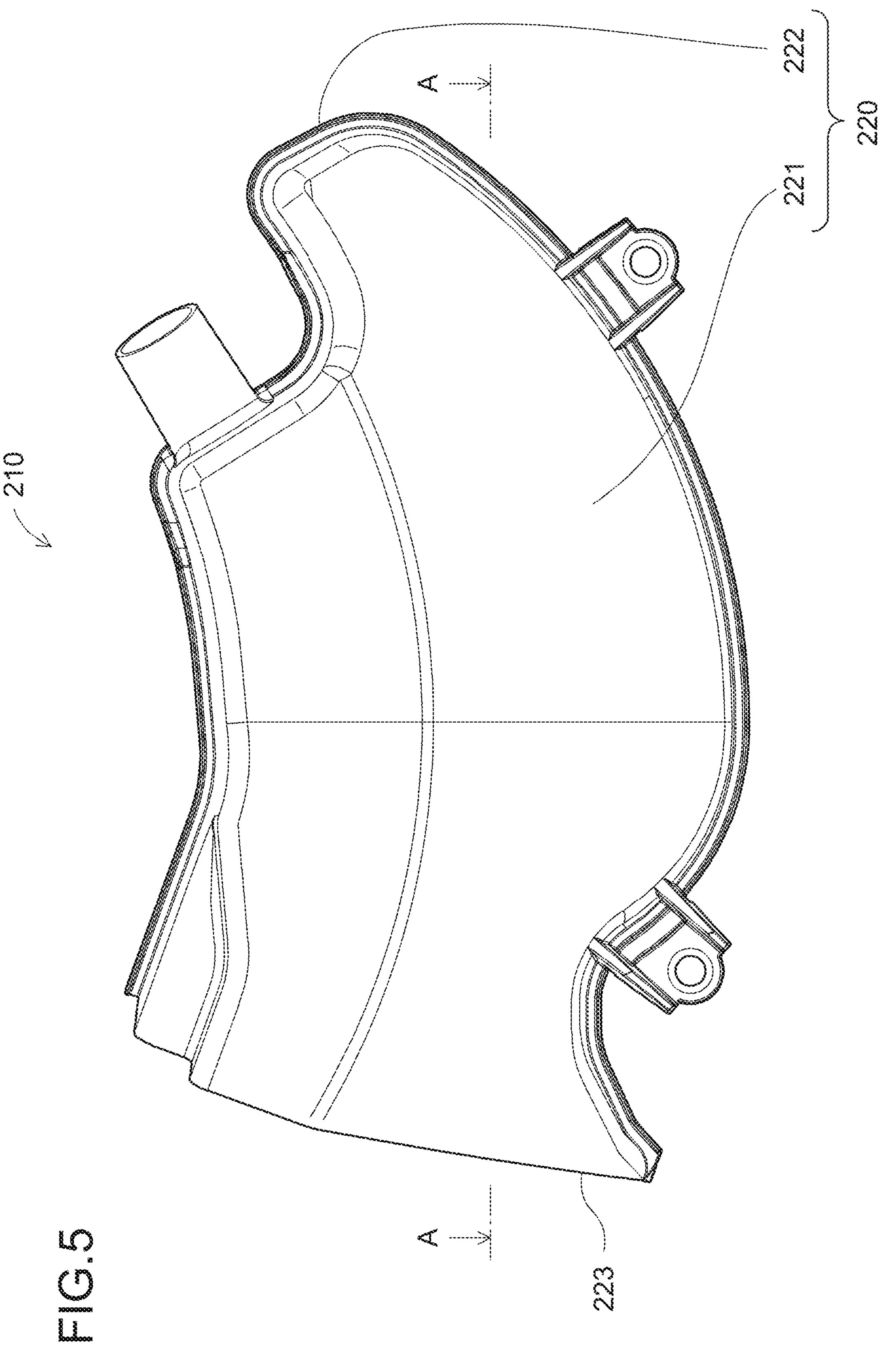
FIG. 5 is a plan view of the air conducting member according to a preferred embodiment of the present invention.
Figure 6:
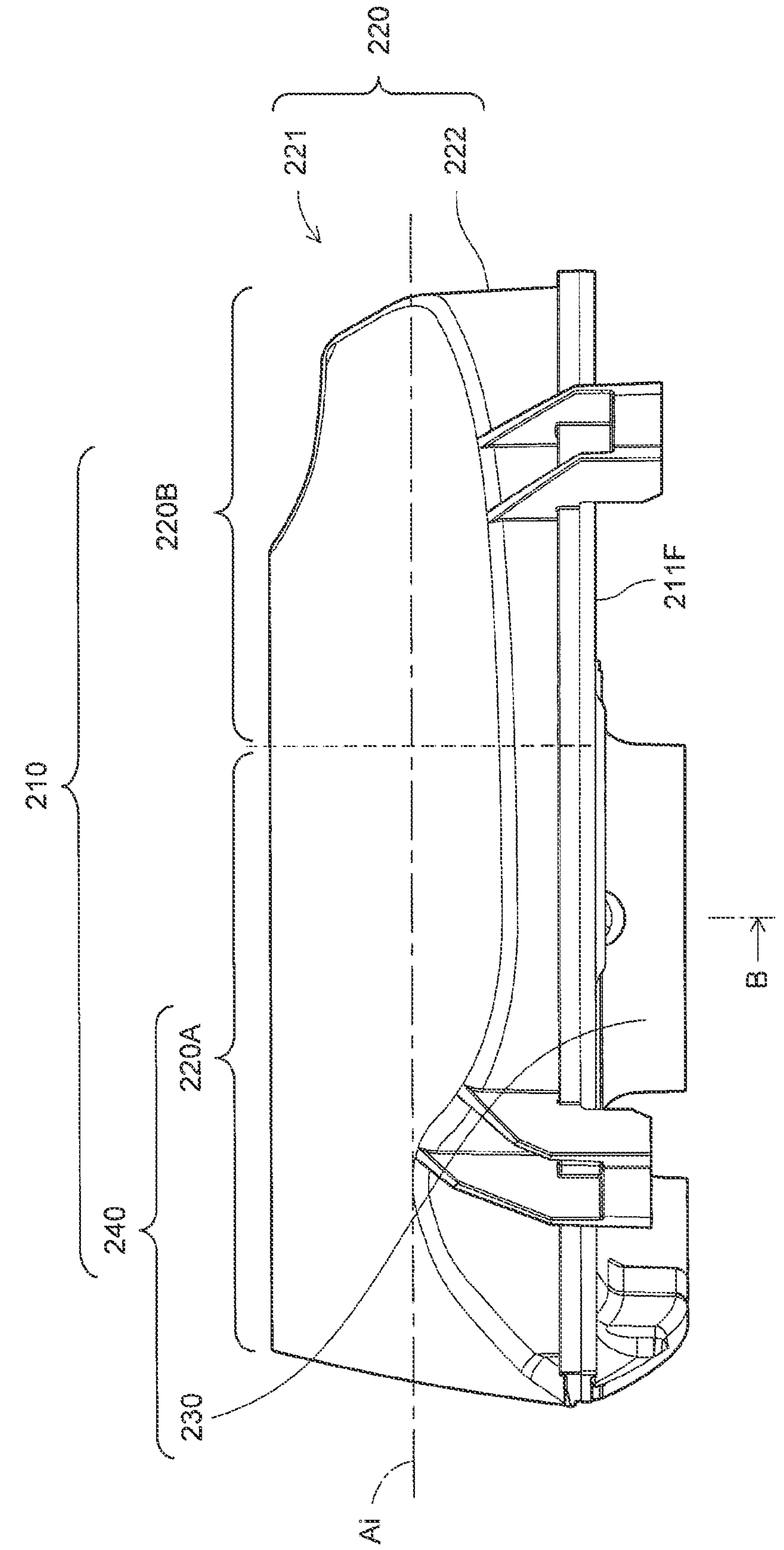
FIG. 6 is a side view of the air conducting according to a preferred embodiment of the present invention.
Figure 7:
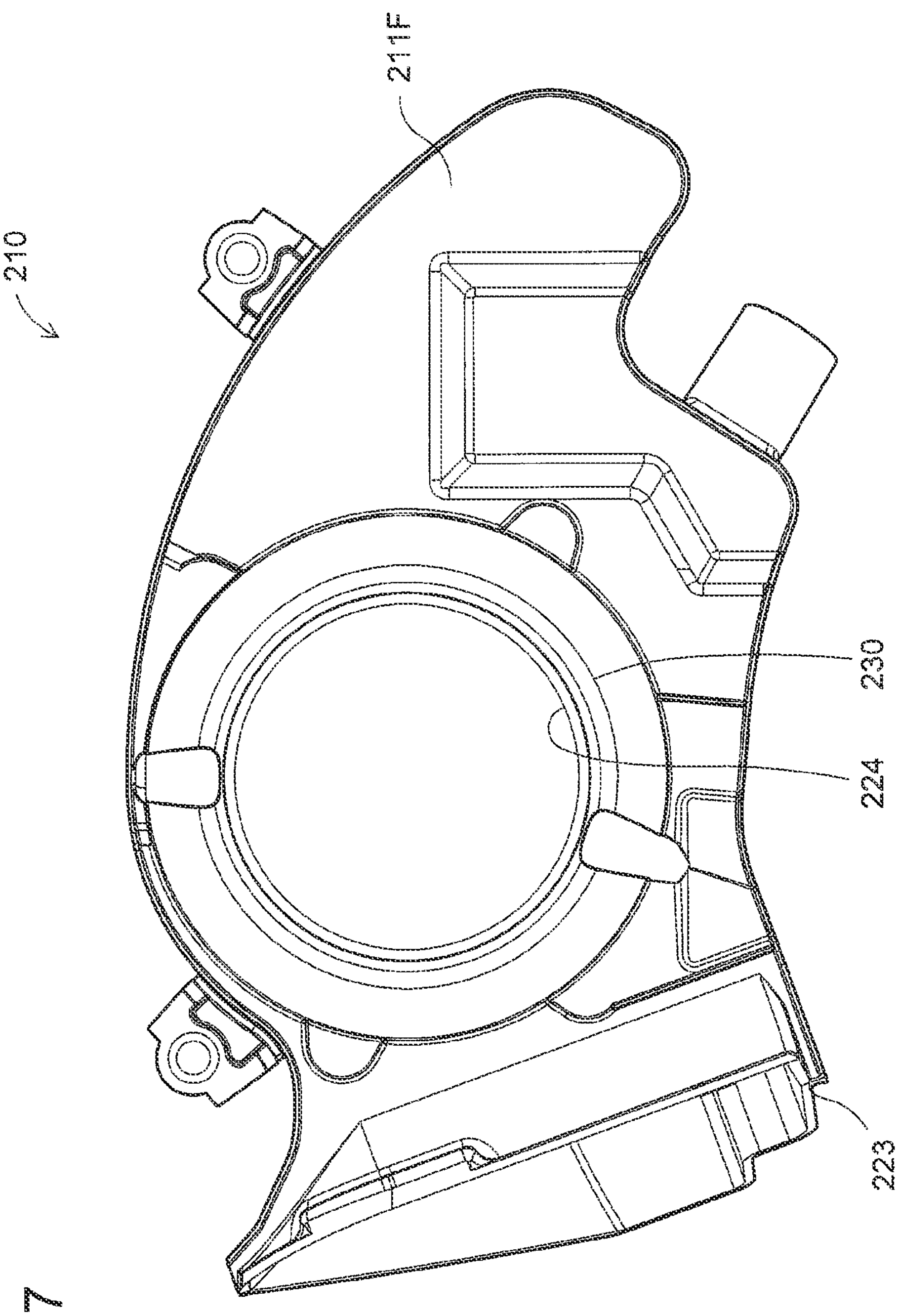
FIG. 7 is a bottom view of the air conducting member according to a preferred embodiment of the present invention.
Figure 8:
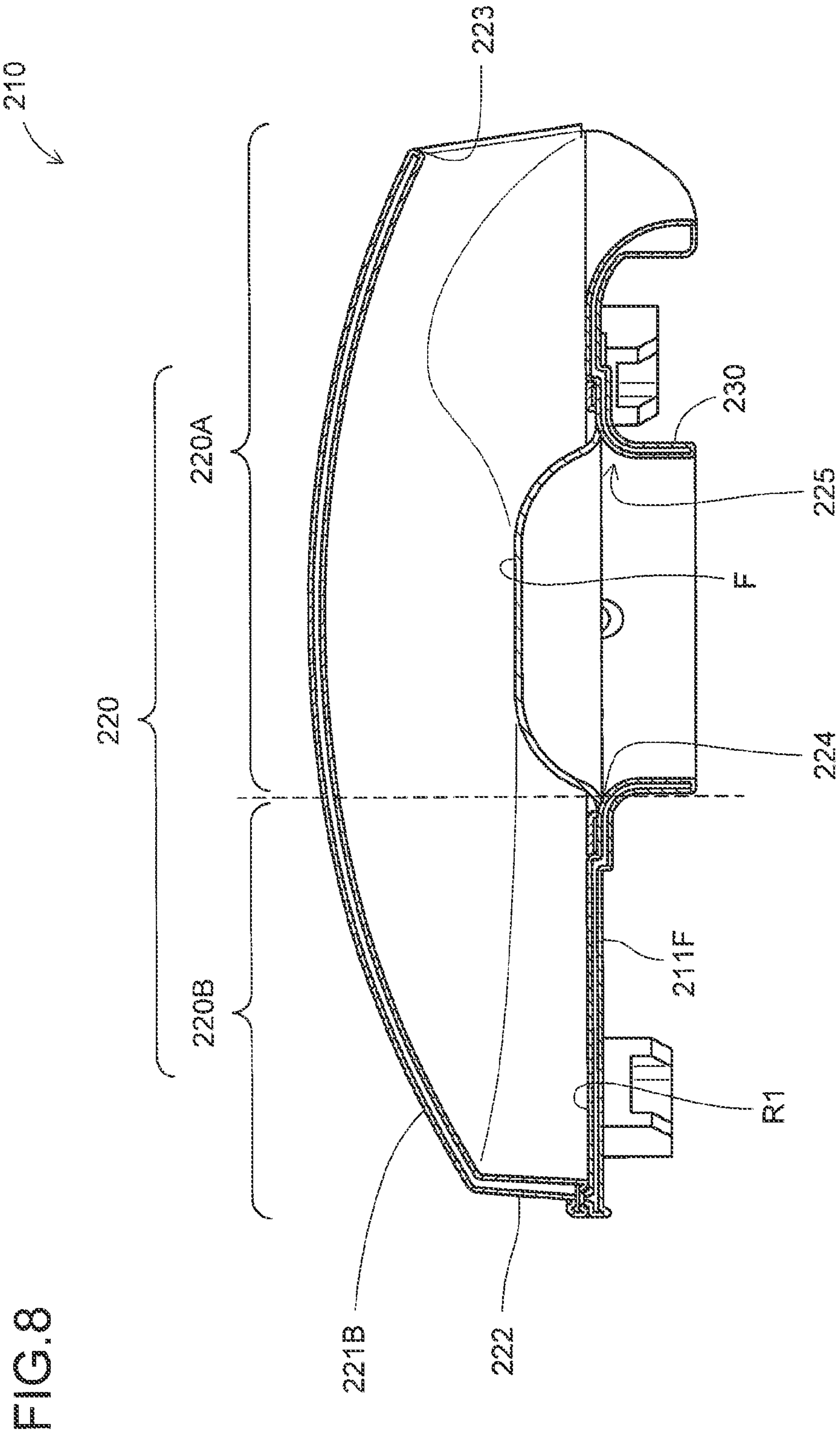
FIG. 8 is a cross-sectional view taken along line VIII-VIII in FIG. 5.
Figure 9:
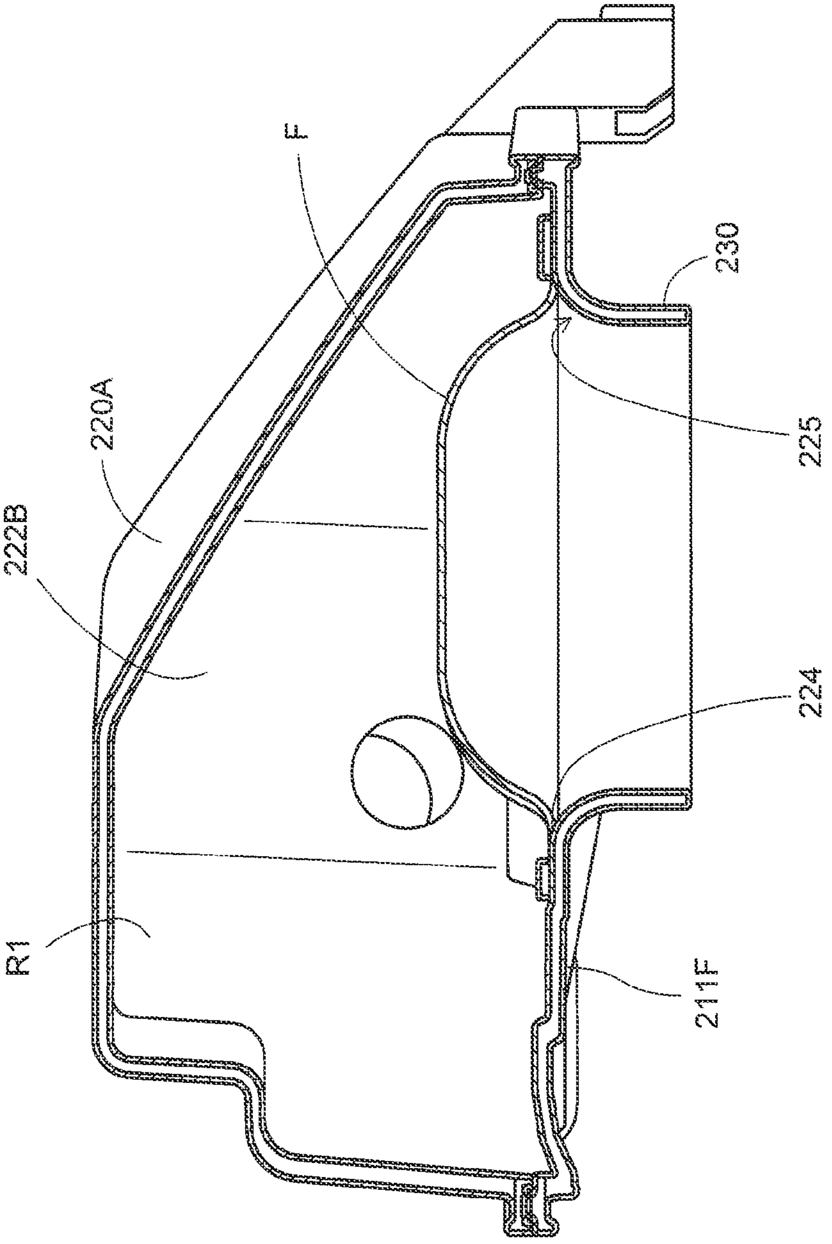
FIG. 9 is a cross-sectional view taken along line IX-IX in FIG. 6.

As shown in FIG. 4, the air conducting member 210 includes a body 220 and a second intake pipe 230. As shown in FIGS. 4 and 6, the body 220 includes a tubular peripheral wall 221 extending in the axis Ai direction (left-right direction in FIG. 5), an end wall 222 arranged to close one end of the peripheral wall 221, and an intake port 223 to take air into the inside opposite to the end wall 222. As shown in FIGS. 8 and 9, a portion of the peripheral wall 221 has a flat plate portion 211F, and the flat plate portion 211F includes a through-hole 224. The through-hole 224 extends through the flat plate portion 211F.

The second intake pipe 230 is tubular, as shown in FIG. 4, and the end of the second intake pipe 230, which extends from the edge of the through-hole 224 to the outside of the body 220 perpendicular or substantially perpendicular to the flat plate portion 211F as shown in FIGS. 8 and 9, is connected to the throttle body 250.

As shown in FIGS. 8 and 9, inside the body 220, a filter F is attached to cover the through-hole 224 in order to remove dust and other foreign matter from the air supplied to the engine main body 122.

In the body 220, the portion from the intake port 223 to the through-hole 224 (the portion to the left of the dashed line in FIG. 6) defines a first intake pipe 220A, and the portion closer to the end wall 222 than the through-hole 224 (the portion to the right of the dashed line in FIG. 6) defines the extension pipe 220B. That is, the second intake pipe 230 is connected to the downstream end of the first intake pipe 220A and extends at an angle with respect to the axis Ai direction of the first intake pipe 220A. In the present preferred embodiment, the second intake pipe 230 extends perpendicular or substantially perpendicular to the axis Ai direction of the first intake pipe 220A. The extension pipe 220B extends along the axis Ai direction of the first intake pipe 220A from the connection between the first intake pipe 220A and the second intake pipe 230 (the position of the dashed line in FIG. 6).

The first intake pipe 220A and the second intake pipe 230 define the main intake pipe 240 through which the air introduced from the intake port 223 and supplied to the internal combustion engine flows. The end wall 222 and an extended peripheral wall 221B of the peripheral wall 221 defining the extension pipe 220B correspond to the partition wall closing (or enclosing) the entire extension pipe 220B except for the portion adjacent to the main intake pipe 240 (position adjacent to the dashed line in FIG. 8) in the internal space of the extension pipe 220B (resonance chamber R1).

In the main intake pipe 240, the inner circumferential surface of the connection of the second intake pipe 230 to the first intake pipe 220A (the position adjacent to the edge of the through-hole 224) has a curved surface 225 curved in an arc from the first intake pipe 220A to the second intake pipe 230, as shown in FIGS. 8 and 9.

The surge tank 260 includes an internal air chamber to equalize the supply of air to the multiple cylinders of the engine main body 122. As shown in FIG. 3, the intake manifold 270 includes a manifold body 271 having an internal space communicating with the air chamber of the surge tank 260, and multiple branch pipes 272 extending from the manifold body 271 and connected to the multiple intake ports of the engine main body 122, respectively.

As shown in FIG. 3, the throttle body 250 is interposed between the second intake pipe 230 and the surge tank 260. The throttle body 250 includes a throttle valve therein and controls the inflow of air from the second intake pipe 230 to the surge tank 260.

The exhaust device 300 is connected to an exhaust port to discharge the exhaust from the engine main body 122 to the outside of the outboard motor 100, and includes an exhaust manifold 310 connected to the exhaust port and an exhaust pipe 320 connected to the downstream side of the exhaust manifold 310, as shown in FIGS. 2 and 3.

As shown in FIG. 2, the exhaust pipe 320 includes an upper exhaust pipe 330 and a lower exhaust pipe 340. The upper exhaust pipe 330 is located inside the cowl 114 and the upper casing 116*a*. The upper exhaust pipe 330 includes an upper exhaust port 331 located above the waterline when the boat 1 is on the water. The lower exhaust pipe 340 branches from the upper exhaust pipe 330 and is located inside the lower cowl 114*b*. The lower exhaust pipe 340 includes a lower exhaust port 341 located below the waterline when the boat 1 is on the water.

When the engine main body 122 is operated at a relatively low speed, the exhaust flows through the upper exhaust pipe 330 and is discharged from the upper exhaust port 331 into the air. In contrast, when the engine main body 122 is operated at a relatively high speed, the exhaust not only flows through the upper exhaust pipe 330 and is discharged from the upper exhaust port 331 into the air but also flows from the upper exhaust pipe 330 to the lower exhaust pipe 340 and is discharged into the water through the lower exhaust port 341.

The upper exhaust pipe 330 is provided with a switch valve 332 to open and close the flow path. When the switch valve 332 is open, exhaust from the engine main body 122 is able to pass through the switch valve 332 in the upper exhaust pipe 330 and also flow through the lower exhaust pipe 340. In contrast, when the switch valve 332 is closed, the exhaust from the engine main body 122 is stopped at the switch valve 332 in the upper exhaust pipe 330, and the flow of exhaust to the lower exhaust pipe 340 is restricted.

The propeller 112 is a rotating body including a plurality of blades. The propeller 112 is located relatively low in the outboard motor 100. The propeller 112 generates thrust by rotating.

The power transmission mechanism 130 transmits power generated in the engine assembly 120 to the propeller 112. At least a portion of the power transmission mechanism 130 is accommodated in the casing 116. The power transmission mechanism 130 includes a drive shaft 132, a shift mechanism 134, and a propeller shaft 136.

The drive shaft 132 is a rod-shaped member and is located below the crank shaft 124 of the engine main body 122 in an attitude extending in the upper-lower direction. The drive shaft 132 rotates together with the rotation of the crank shaft 124. At least a portion of the drive shaft 132 is accommodated within the casing 116.

The propeller shaft 136 is a rod-shaped member and is located relatively low in the outboard motor 100 in an attitude extending in the front-rear direction. At least a portion of the propeller shaft 136 is accommodated within the lower casing 116*b*. The rear end of the propeller shaft 136 projects to the outside of the lower casing 116*b*. The propeller 112 is attached to the rear end of the propeller shaft 136. The propeller 112 rotates together with the rotation of the propeller shaft 136 around the rotation axis Ap.

The shift mechanism 134 is connected to the lower end of the drive shaft 132 and to the front end of the propeller shaft 136. The shift mechanism 134 includes, e.g., a plurality of gears and a clutch to switch the engagement of the gears, and transmits the rotation of the drive shaft 132 to the propeller shaft 136 in such a manner that the rotation direction is switched. When the shift mechanism 134 transmits the rotation of the drive shaft 132 to the propeller shaft 136 in the normal rotation direction, the propeller 112 rotating in the normal rotation direction together with the propeller shaft 136 generates thrust in the forward direction. In contrast, when the shift mechanism 134 transmits the rotation of the drive shaft 132 to the propeller shaft 136 in the reverse rotation direction, the propeller 112 rotating in the reverse rotation direction together with the propeller shaft 136 generates the thrust in the rearward direction.

The suspension device 150 attaches the outboard motor main body 110 to the hull 10. The suspension device 150 includes a pair of left and right clamp brackets 152, a tilt shaft 160, and a connection bracket 156.

The pair of left and right clamp brackets 152 are located behind the hull 10 in a state separated from each other in the left-right direction, and are fixed to the transom 14 of the hull 10 by using, e.g., bolts. Each clamp bracket 152 includes a cylindrical supporting portion 152*a* provided with a through-hole extending in the left-right directions.

The tilt shaft 160 is a rod-shaped member. The tilt shaft 160 is rotatably supported in the through-hole of the supporting portion 152*a* of the clamp bracket 152. The tilt axis At, which is the center line of the tilt shaft 160, defines an axis in the horizontal direction (left-right direction) in the tilting action of the outboard motor 100.

The connection bracket 156 is sandwiched between the pair of clamp brackets 152, and is supported by the supporting portion 152*a* of the clamp bracket 152 via the tilt shaft 160 in such a manner that the connection bracket 156 is able to rotate around the tilt axis At. The connection bracket 156 is fixed to the outboard motor main body 110. The connection bracket 156 is driven to rotate about the tilt axis At with respect to the clamp bracket 152 by a tilt device (not shown) including an actuator such as, e.g., a hydraulic cylinder.

When the connection bracket 156 rotates about the tilt axis At with respect to the clamp bracket 152, the outboard motor main body 110 fixed to the connection bracket 156 also rotates about the tilt axis At. This achieves the tilting action of rotating the outboard motor main body 110 in the upper-lower direction with respect to the hull 10. By this tilting action, the outboard motor 100 is able to change the angle around the tilt axis At of the outboard motor main body 110 in the range from the tilt-down state in which the propeller 112 is located under the water (the state in which the outboard motor 100 is in the reference attitude, i.e., the state shown in FIG. 1) to the tilt-up state in which the propeller 112 is located above the water surface. Trimming action to adjust the attitude of the boat 1 during travel is also able to be performed by adjusting the angle around the tilt axis At of the outboard motor main body 110.

As described above, the outboard motor 100 includes the engine main body 122, and the intake device 200 to supply air to the engine main body 122. The intake device 200 includes the main intake pipe 240 including the first intake pipe 220A and the second intake pipe 230 connected to the downstream end of the first intake pipe 220A and extending at an angle with respect to the axis Ai direction of the first intake pipe 220A and through which the air supplied to the engine main body 122 flows, and the extension pipe 220B extending from the connection between the first intake pipe 220A and the second intake pipe 230 and including the resonance chamber R1 therein, and the extension pipe 220B includes the extended peripheral wall 221B and the end wall 222 closing the entire resonance chamber R1 except for the portion adjacent to the main intake pipe 240.

According to the above configuration, the noise transmitted from the engine main body 122 through the second intake pipe 230 is silenced by the effect of the air-column resonance generated by the first intake pipe 220A and the extension pipe 220B. Since not only the extension pipe 220B but also the first intake pipe 220A is used as a resonator, it is possible to reduce the size compared to an intake device with the conventional Helmholtz resonator. In addition, the resonant frequency is able to be adjusted by adjusting the distance of the second intake pipe 230 from the end (end wall 222) of the extension pipe 220B, which facilitates design changes.

A second preferred embodiment of the present invention will now be described with reference to FIG. 10. The air conducting member 400 of the present preferred embodiment is provided in the intake device of the outboard motor, as in the first preferred embodiment, and includes an extension pipe 410 having a shape that is different from that of the first preferred embodiment. In the present preferred embodiment, identical reference characters are used for the same components as in the first preferred embodiment, and descriptions of the same structure, action, and effect will be omitted.

Figure 10:
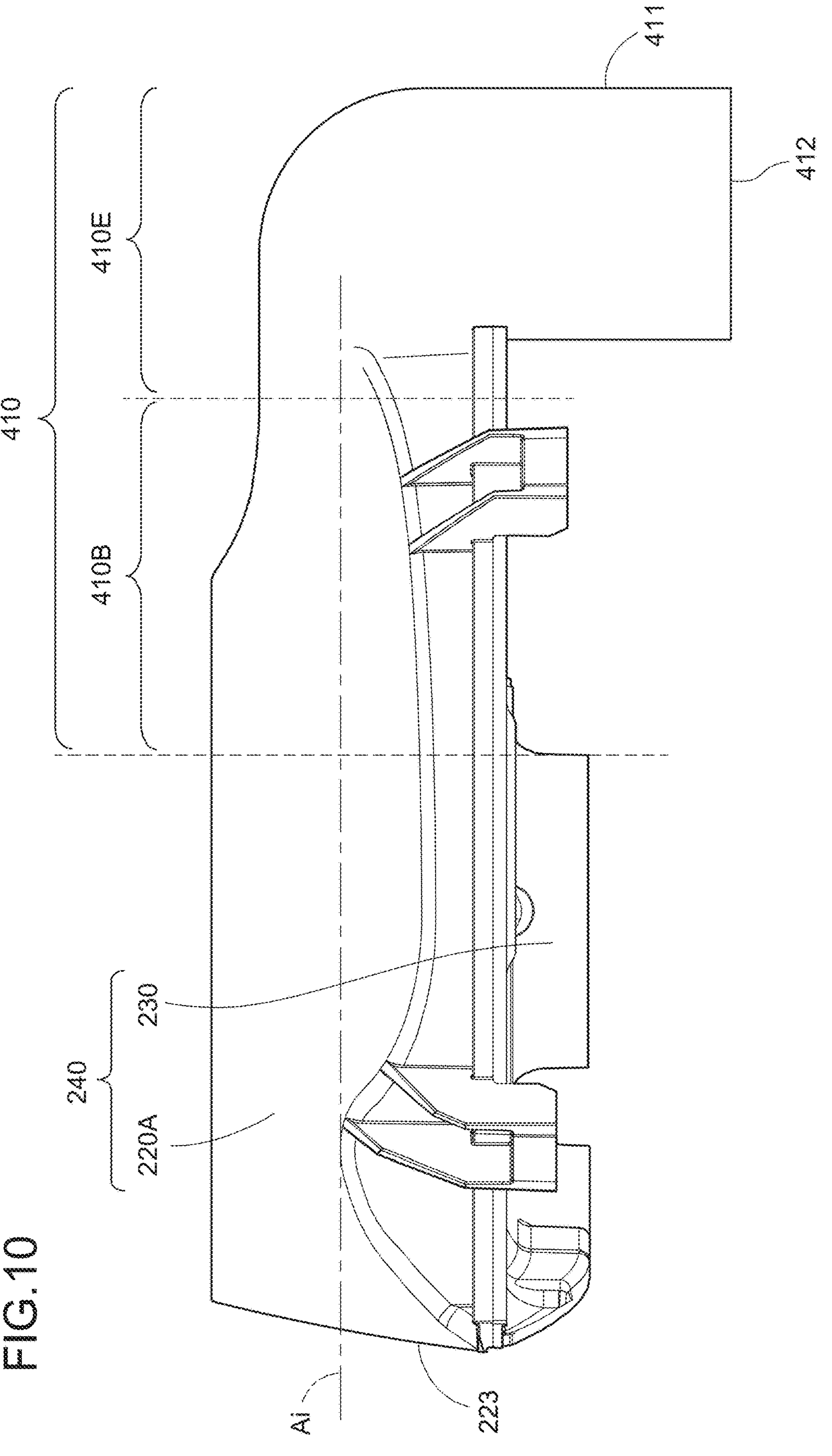
FIG. 10 is a side view of an air conducting member according to another preferred embodiment of the present invention.

As shown in FIG. 10, The air conducting member 400 includes the main intake pipe 240 and the extension pipe 410. The extension pipe 410 includes a tubular peripheral wall 411 extending from the first intake pipe 220A, and an end wall 412 to close the end of the peripheral wall 411.

The extension pipe 410 has an L-shaped bent shape as a whole. In the extension pipe 410, the portion adjacent to the first intake pipe 220A is referred to as a base end portion 410B, and the portion more distal than the base end portion 410B (the portion closer to the end wall 412) is referred to as a tip end portion 410E. The base end portion 410B extends along the axis Ai direction of the first intake pipe 220A (left-right direction in FIG. 10). The tip end portion 410E extends perpendicular or substantially perpendicular to the base end portion 410B.

Figure 11:
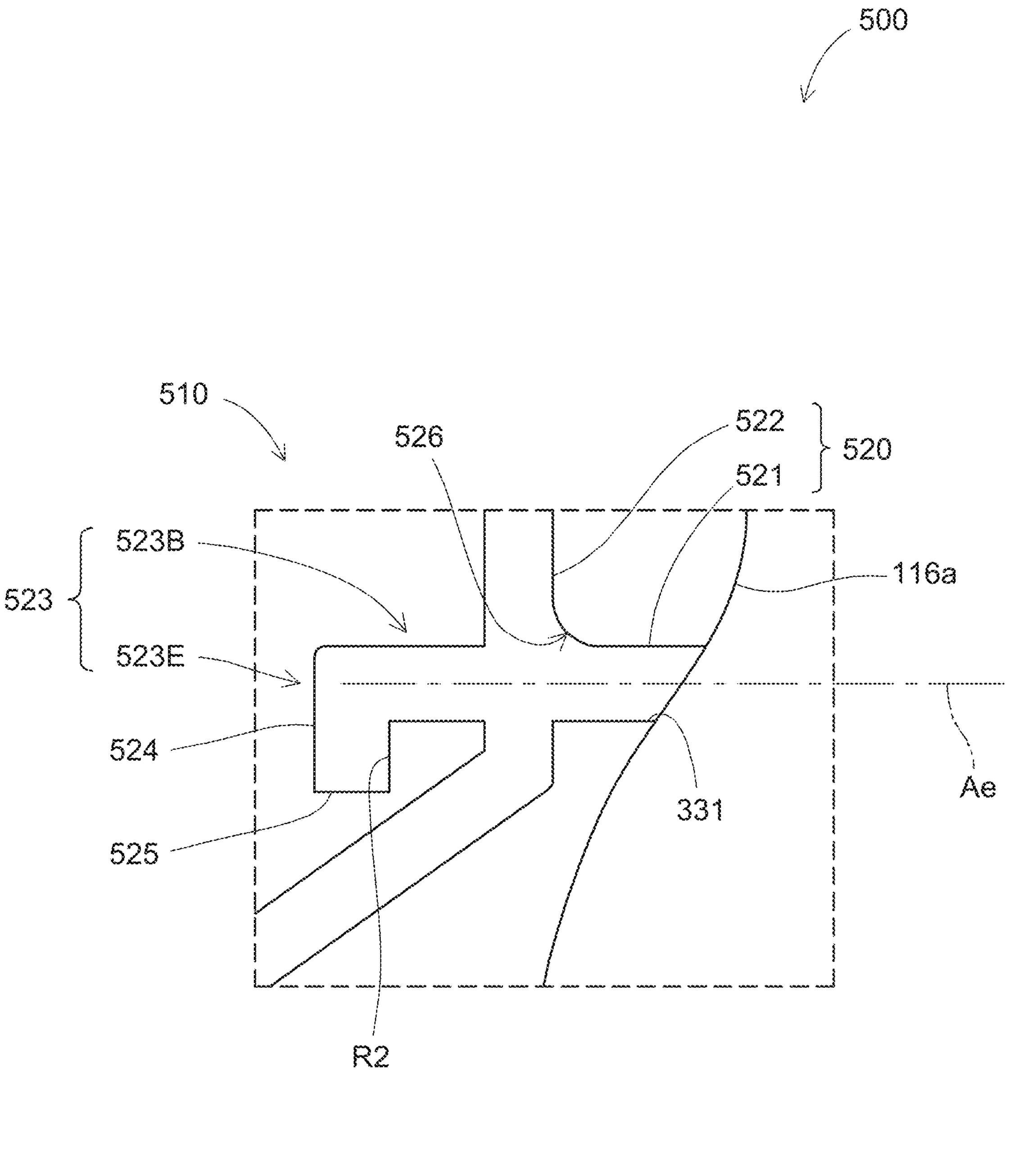
FIG. 11 is a partially enlarged side view schematically illustrating a configuration of a main portion of an upper exhaust pipe in an exhaust according to another preferred embodiment of the present invention.

Next, a third preferred embodiment of the present invention will be described with reference to FIG. 11. The exhaust device 500 of the present preferred embodiment includes an upper exhaust pipe 510 provided in the outboard motor as in the first preferred embodiment to discharge the exhaust gas discharged from the engine main body 122 to the outside, and connected to the downstream end of the exhaust manifold 310. In the present preferred embodiment, identical reference characters are used for the same components as in the first preferred embodiment, and descriptions of the same structure, action, and effect will be omitted.

The upper exhaust pipe 510 includes an upper exhaust port 331 located above the waterline when the boat 1 is on the water.

The upper exhaust pipe 510 includes a tubular first exhaust pipe 521 connected to the upper exhaust port 331, a tubular second exhaust pipe 522 extending from an upstream end of the first exhaust pipe 521, and a tubular extension pipe 523 also extending from the first exhaust pipe 521.

The second exhaust pipe 522 extends at an angle with respect to the axis Ae direction of the first exhaust pipe 521. In the present preferred embodiment, the second exhaust pipe 522 extends perpendicular or substantially perpendicular to the axis Ae direction of the first exhaust pipe 521. An upsteam end of the second exhaust pipe 522 is connected to the downstream end of the exhaust manifold 310. The first exhaust pipe 521 and the second exhaust pipe 522 define a main exhaust pipe 520 through which the air discharged from the engine main body 122 flows.

The extension pipe 523 includes a tubular peripheral wall 524 extending from the connection between the first exhaust pipe 521 and the second exhaust pipe 522, and an end wall 525 to close the end opposite to the first exhaust pipe 521 in the peripheral wall 524. The peripheral wall 524 and the end wall 525 define partition walls that close the entire interior space of the extension pipe 523 (resonance chamber R2) except for the portion adjacent to the main exhaust pipe 520 (the right end of the extension pipe 523 in FIG. 11).

The extension pipe 523 has an L-shaped bent shape as a whole. In the extension pipe 523, the portion adjacent to the first exhaust pipe 521 is referred to as a base end portion 523B, and the portion more distal than the base end portion 523B (the portion closer to the end wall 525) is referred to as a tip end portion 523E. The base end portion 523B extends along the axis Ae direction of the first exhaust pipe 521 (upper-lower direction in FIG. 11). The tip end portion 523E extends perpendicular or substantially perpendicular to the base end portion 523B.

In the main exhaust pipe 520, the inner circumferential surface of the connection of the second exhaust pipe 522 connected to the first exhaust pipe 521 has a curved surface 526 curved in an arc from the first exhaust pipe 521 to the second exhaust pipe 522.

According to the above configuration, the noise transmitted from the engine main body 122 through the second exhaust pipe 522 is silenced by the effect of the air-column resonance generated by the first exhaust pipe 521 and the extension pipe 523. Since not only the extension pipe 523 but also the first exhaust pipe 521 is able to be used as a resonator, it is possible to reduce the size compared to an intake device with the conventional Helmholtz resonator. In addition, the resonant frequency is able to be adjusted by adjusting the distance of the second exhaust pipe 522 from the end (end wall 525) of the extension pipe 523, which facilitates design changes.

In the above preferred embodiments, the boat propulsion device is an outboard motor 100, but the boat propulsion device may be an inboard motor, an inboard-outboard motor, or a jet propeller.

In the above preferred embodiments, the body 220 (the first intake pipe 220A and the extension pipe 220B) is tubular with a flat plate portion 211F, but the shape is not limited thereto as long as the first intake pipe and the extension pipe are tubular. The first intake pipe and the extension pipe may have different shapes. The same applies to the first exhaust pipe and the extension pipe in the exhaust device.

In the above preferred embodiments, the second intake pipe 230 extends perpendicular or substantially perpendicular to the axis Ai direction of the first intake pipe 220A, but the angle is not limited thereto as long as the second intake pipe is arranged at a certain angle with respect to the first intake pipe. The same applies to the first and second exhaust pipes in the exhaust device.

In the above preferred embodiments, the extension pipe 220B extends along the axis Ai direction of the first intake pipe 220A, but the extension pipe may extend at an angle with respect to the axis direction of the first intake pipe. It is also possible that the base end portion of the extension pipe extends at an angle with respect to the axial direction of the first intake pipe and that the tip end portion is bent or curved. The same applies to the first exhaust pipe and the extension pipe in the exhaust device.

In the above second preferred embodiment, the extension pipe is bent in an L-shape, but the extension pipe may be curved. The extension pipe may be bent or curved at any angle. In addition, the extension pipe may have multiple bends or curves. The same applies to the extension pipe of the exhaust device.

In the above preferred embodiments, the inner circumferential surface of the main intake pipe 240 has the curved surface 225, but the inner circumferential surface of the main intake pipe may not have the curved surface. The same applies to the main exhaust pipe in the exhaust device.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A boat propulsion device comprising:

an internal combustion engine; and an intake device to supply air to the internal combustion engine; wherein the intake device includes:

a main intake pipe including a first intake pipe and a second intake pipe including an upstream end connected to a downstream end of the first intake pipe and extending at an angle with respect to an axial direction of the first intake pipe and through which the air supplied to the internal combustion engine flows; and an extension pipe extending directly from, and in communication with, a connection between the downstream end of the first intake pipe and the upstream end of the second intake pipe and including a resonance chamber therein; and the extension pipe includes a partition wall that closes the extension pipe except for a portion of the extension pipe adjacent to the main intake pipe.

2. The boat propulsion device according to claim 1, wherein the extension pipe includes a base end adjacent to the downstream end of the first intake pipe and extending along the axial direction of the first intake pipe.

3. The boat propulsion device according to claim 1, wherein the second intake pipe is perpendicular or substantially perpendicular to the axial direction of the first intake pipe.

4. The boat propulsion device according to claim 1, wherein the extension pipe has a bent shape or a curved shape.

5. The boat propulsion device according to claim 1, wherein an inner circumferential surface of the main intake pipe at the connection has a curved surface from the first intake pipe to the second intake pipe.

6. A boat propulsion device comprising:

an internal combustion engine; and an intake device to supply air to the internal combustion engine; wherein the intake device includes:

a main intake pipe including a first intake pipe and a second intake pipe including an upstream end connected to a downstream end of the first intake pipe and extending at an angle with respect to an axial direction of the first intake pipe and through which the air supplied to the internal combustion engine flows; and an extension pipe extending directly from, and in communication with, a connection between the downstream end of the first intake pipe and the upstream end of the second intake pipe.

7. A boat propulsion device comprising:

an internal combustion engine; and an exhaust device to discharge exhaust gas from the internal combustion engine to outside the boat propulsion device; wherein the exhaust device includes:

a main exhaust pipe including a first exhaust pipe and a second exhaust pipe including a downstream end connected to an upstream end of the first exhaust pipe and extending at an angle with respect to an axial direction of the first exhaust pipe and through which the exhaust gas discharged from the internal combustion engine flows; and an extension pipe extending directly from, and in communication with, a connection between the upstream end of the first exhaust pipe and the downstream end of the second exhaust pipe and including a resonance chamber therein; and the extension pipe includes a partition wall that closes the extension pipe except a portion of the extension pipe adjacent to the main exhaust pipe.

8. The boat propulsion device according to claim 7, wherein the extension pipe includes a base end portion adjacent to the upstream end of the first exhaust pipe and extending along the axial direction of the first exhaust pipe.

9. The boat propulsion device according to claim 7, wherein the second exhaust pipe is perpendicular or substantially perpendicular to the axial direction of the first exhaust pipe.

10. The boat propulsion device according to claim 7, wherein the extension pipe has a bent shape or a curved shape.

11. The boat propulsion device according to claim 7, wherein an inner circumferential surface of the main intake pipe at the connection has a curved surface from the first intake pipe to the second intake pipe.

* * * * *